(No Model.)

P. SAACKE.
REAMER.

No. 595,346. Patented Dec. 14, 1897.

Section A-B.

Witnesses
H. van Oldenneel
E. A. Scott

Inventor
Paul Saacke
by Richardson
Attys

UNITED STATES PATENT OFFICE.

PAUL SAACKE, OF PFORZHEIM, GERMANY, ASSIGNOR TO GEBRÜDER SAACKE, OF SAME PLACE.

REAMER.

SPECIFICATION forming part of Letters Patent No. 595,346, dated December 14, 1897.

Application filed October 12, 1896. Serial No. 608,594. (No model.)

*To all whom it may concern:*

Be it known that I, PAUL SAACKE, a subject of the Grand Duke of Baden, residing at Pforzheim, in the Grand Duchy of Baden, Germany, have invented new and useful Improvements in Reamers, of which the following is a specification.

This invention relates to a reamer the cutting edges of which are interrupted in such a manner that the places of interruption of one cutting edge are opposite to the subsequent cutting edge. By this arrangement of the intermediate spaces and the edges the latter when working take off the material left by the former. Owing to this arrangement the chip is broken in reaming the hole— *i. e.*, the material to be reamed is taken away in the shape of very short chips. The necessary amount of power is very considerably reduced by the diminished surface of application. The reamer works entirely noiseless. It is not stopped by the material taken away and the wall of the boring does not show any roughness, but it is, even in the case of very short holes, completely smooth. The reamers hitherto used do not offer these advantages, and, above all, they do not combine them.

Figure 1:
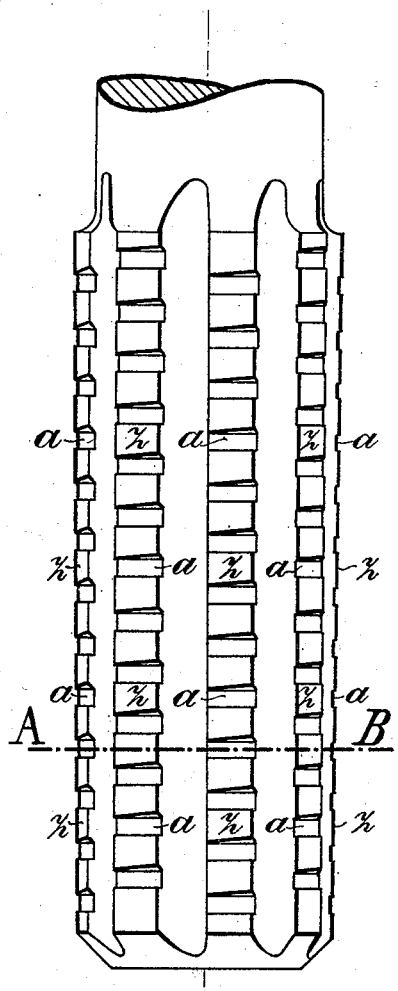
Figure 2:
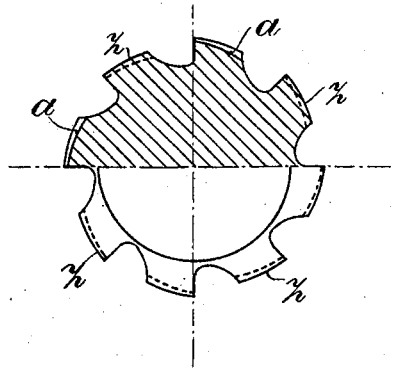

In the drawings, Figure 1 is a side view of the invention; and Fig. 2 is a partial section on line A B of Fig. 1, the other half of Fig. 2 being an end view of the reamer.

The reamer has a series of rows of teeth, the teeth of each row being shown at Z, while the intermediate spaces are shown at $a$. The lower edges of the teeth are slanting, thus providing beveled teeth transversely of the row. The rows are separated by grooves running longitudinally of the reamer, and by these grooves the reamer may be ground true without danger of changing the form of the teeth. The teeth of one row are opposite the spaces between the teeth of the next row and are double the width of said spaces.

I claim—

A reamer adapted to make cylindrical borings, comprising a body of cylindrical form having cutting-teeth, interrupted by intermediate spaces, the cutting-teeth of one series being displaced with respect to those of the other series so that a cutting-tooth of one series will be opposite a space of the adjacent series, the said teeth being double the width of the spaces lying opposite them and said teeth having a lower slant edge and being arranged in longitudinal rows with grooves running longitudinally of the tool between the teeth, substantially as described.

In testimony whereof I have signed my name to this specification in the presence of two subscribing witnesses.

PAUL SAACKE.

Witnesses:
 OTTO SAILER,
 CHRISTIAN BAUER.